United States Patent [19]
Buezis

[11] Patent Number: 5,435,343
[45] Date of Patent: Jul. 25, 1995

[54] TWO STAGE NATURAL/LP GAS CONVERTIBLE PRESSURE REGULATOR VALVE WITH SINGLE SERVO CONTROLLER

[75] Inventor: James G. Buezis, Plymouth, Minn.

[73] Assignee: Honeywell Inc., Minneapolis, Minn.

[21] Appl. No.: 203,972

[22] Filed: Mar. 1, 1994

[51] Int. Cl.[6] .................... G05D 16/06; G05D 16/16; G05D 16/20
[52] U.S. Cl. .............................. 137/489; 137/505.14; 251/129.18
[58] Field of Search ........................ 137/505.14, 489; 251/129.18, 129.19

[56] References Cited

U.S. PATENT DOCUMENTS 4,637,429 1/1987 Dietiker et al. .
4,850,530 7/1989 Uecker .

*Primary Examiner*—Gerald A. Michalsky
*Attorney, Agent, or Firm*—Charles L. Rubow

[57] ABSTRACT

A convertible two-stage pressure regulator in which a main valve regulates fluid flow between an inlet and outlet in response to a control pressure produced by a servo regulator valve, the control pressure depending on outlet pressure and the force provided by a regulator spring to a diaphragm carrying a servo regulator valve closure element. Compression of the regulator spring is controlled by a solenoid armature in a plunger assembly which is selectively positionable by a selector knob to obtain higher or lower regulator spring force. Adjustable stops provide for individual adjustment of low and high outlet pressures for each of two pressure ranges. Substantially identical air gaps in the magnetic circuit of the solenoid are provided for both pressure ranges by a magnetic pole piece in the plunger assembly which extends beyond the solenoid coil in one direction and a solenoid armature which extends beyond the solenoid coil in the opposite direction.

21 Claims, 3 Drawing Sheets

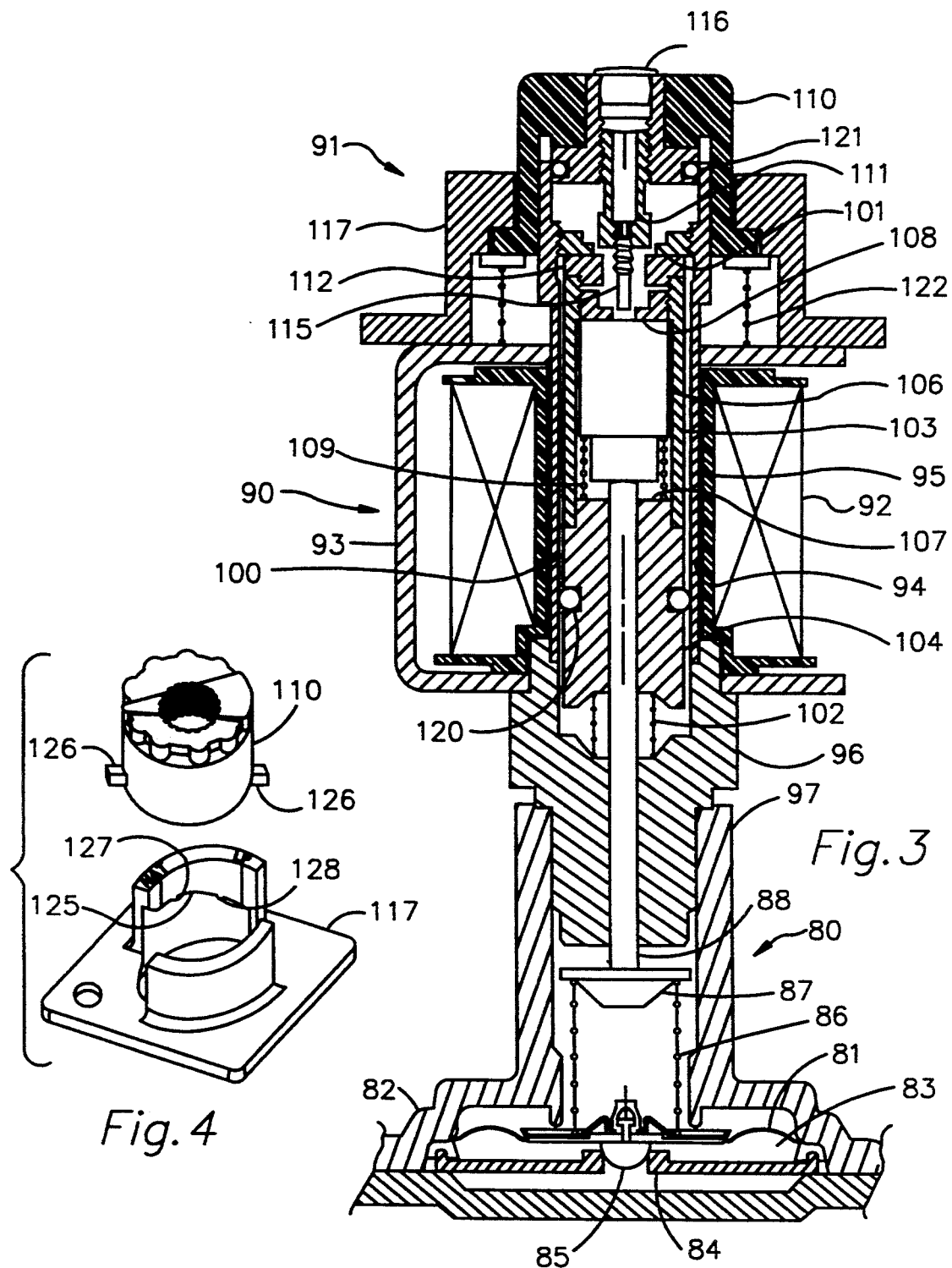

TWO STAGE NATURAL/LP GAS CONVERTIBLE PRESSURE REGULATOR VALVE WITH SINGLE SERVO CONTROLLER

BACKGROUND OF THE INVENTION

The present invention relates generally to fluid pressure regulators, and, more specifically, to two-stage pressure regulating valves convertible without parts replacement to separate output pressure ranges, such as those typically used in natural and LP fuel gas controls.

Applications have existed for some time for pressure regulating valves capable of regulating to either of two electrically selected pressures. In general, these applications have been somewhat specialized, and the required volumes relatively small, thus providing little incentive for exploring nontraditional designs. To the extent two-stage pressure regulating valve designs are known, they generally employ a solenoid actuator to change the force supplied by a regulator spring.

A pressure regulating valve application which is receiving increasing interest is fuel gas control for small furnaces, such as those used in single family residences, including both permanent fixed location homes and mobile homes. Certain U.S. furnace manufacturers have developed high efficiency furnace designs which rely on two stages of furnace operation. When heat is first called for, and under moderate heat requirements, the furnace is fired at a low to moderate rate. If firing at that rate does not provide the heat output required for existing conditions, firing is stepped to a higher rate.

Another factor which impacts gas valve manufacturers and users is that both natural gas and gas produced from liquefied petroleum (LP) or propane are in common use as fuel gases. These gases have different burning characteristics and are supplied to a furnace or other burner apparatus under different pressures. Specifically, gas generated from liquefied petroleum has a faster flame front. Accordingly, it is supplied to a burner at a higher pressure, e.g., 10 inches $H_2O$, which induces more oxygen entrainment. In contrast, natural gas is typically supplied to a furnace or burner at a pressure of 3.5 inches $H_2O$. Accordingly, a pressure regulating gas valve for a furnace or other appliance must regulate to a higher pressure for LP gas than for natural gas.

There are various situations in which it is not known at the outset which type of fuel gas will be used, and/or in which the type of fuel gas may be changed at some point during the operating life of a furnace or other appliance. Either situation often occurs with a mobile home. Another common situation arises in connection with new construction of permanent fixed location dwellings. Initially natural gas may not be available because underground gas lines are not in place in the area, or because hook-up to natural gas lines is delayed by frozen ground, or for other reasons. Typical solutions in the past have been to either change out the entire gas valve at the time of conversion to a different fuel gas, or to replace certain components, such as regulator springs or pressure regulator modules. Both of these solutions are undesirable for several reasons. Further, mobile home requirements now dictate that gas valve conversion be achieved without replacement of gas valve parts.

One recent gas valve design which addresses this problem employs an solenoid plunger assembly whose position along the axis of plunger movement is determined in part by a cam arrangement in a cylindrical stop mechanism co-axial with the plunger assembly. The stop mechanism includes two parts having facing ends formed at an angle different from perpendicular to the axis, so that as the first part is rotated with respect to the second part, the second part is axially displaced. The second part is mechanically coupled to the solenoid armature so as to change the unactuated and actuated positions of the armature relative to the solenoid coil, thereby changing the unactuated and actuated compressions of a regulator spring.

This design accommodates only a single low firing rate adjustment and a single high firing rate adjustment. Accordingly, the valve must be adjusted for low and high firing rates each time it is converted between natural and LP gas usage. Obviously, it would be preferable to be able to convert between usages in different gas applications without requiring firing rate adjustments.

An additional disadvantage of this design is that repositioning the solenoid armature relative to the coil for conversion between pressure ranges suitable for natural and LP gas respectively changes the air gaps in the magnetic circuit, thereby resulting in a less than optimum solenoid configuration for one or both of the ranges.

Although gas valves are available for two-stage operation, and gas valves are available which provide for conversion without parts replacement, an increasing need exists for a single gas valve which achieves both objectives, as well as permitting conversion with no or minimum valve adjustments, and providing uniform solenoid performance regardless of the pressure range for which the valve is set. The applicant has devised a design for such a valve which retains the advantageous features of prior limited purpose designs, while adding the capability of two-stage operation, no parts replacement conversion, and conversion without firing rate adjustments.

SUMMARY OF THE INVENTION

The invention is a pressure regulator having first and second electrically determinable stages of operation in each of two pressure ranges which may correspond to pressure ranges suitable for natural and LP gas usage respectively, the pressure regulator including flow control means operable to vary fluid flow as a function of extension of a regulator spring. Extension of the regulator spring is determined in part by solenoid apparatus including a movable support assembly extending along an axis through an opening through the solenoid coil, the movable support assembly being moveable along the axis and biased away from the regulator spring toward a first stop. A solenoid armature is moveable along the axis between second and third stops on the movable support assembly and is biased toward the stop furthest from the regulator spring. A selector assembly manually positionable to either of two positions along the axis includes a fourth stop which, when the selector assembly is in one of its positions, limits travel of the movable support assembly away from the regulator spring, and a fifth stop which, when the selector assembly is in the same position, limits travel of the armature away from the regulator spring.

The movable support assembly may include a magnetic pole piece which is arranged relative to the armature so that the pole piece and armature extend from locations within the solenoid coil to locations outside the solenoid coil on opposite ends thereof so that the solenoid has substantially the same air gaps for both positions of the movable support assembly. The movable support assembly may include a tubular section which contains the armature, and which is contained within a tubular barrel forming part of a second support assembly extending from the pressure regulator housing.

The positions of the first stop, the stop on the movable support assembly furthest from the regulator spring and the fourth and fifth stops on the selector assembly may be individually adjusted along the axis. Finally, the regulator spring may be mechanically coupled to the armature by means of a strut which extends through a hole through the magnetic pole piece and a guide hole through a plug which attaches the tubular barrel to the pressure regulator housing.

BRIEF DESCRIPTION OF THE DRAWINGS

FIG. 3 is an enlarged partial cross-sectional view of an alternative embodiment of a pressure regulator servo valve in accordance with the applicant's invention, this embodiment incorporating a rotatable knob conversion selector, the knob being rotated to its natural gas setting; and FIG. 4 is an enlarged exploded perspective view of certain components of the conversion selector assembly used in the pressure regulator servo valve of FIG. 3.

DESCRIPTION OF THE PREFERRED EMBODIMENTS

Figure 1:
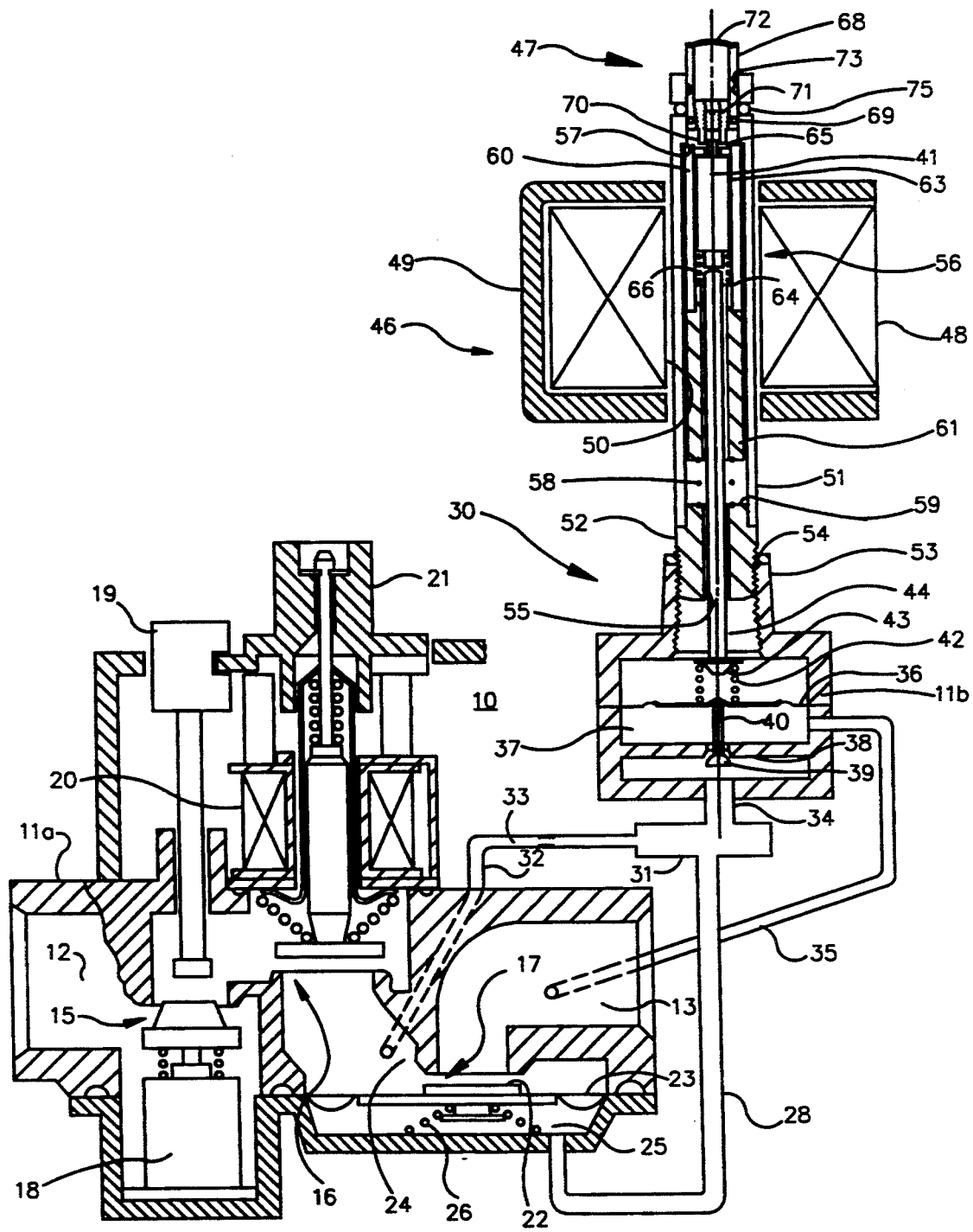
FIG. 1 is a partially schematic cross-sectional view of one embodiment of a convertible two-stage gas valve in accordance with the applicant's invention, this embodiment incorporating a push button conversion selector.

In FIG. 1, reference numeral 10 generally identifies a fuel gas valve, which, except for the pressure regulating portion, is similar to a gas valve of conventional design shown and described in detail in U.S. Pat. No. 4,790,352 issued Dec. 13, 1988, and assigned to the assignee of the present application. This valve, which is configured for use in a standing pilot burner system, is shown only as an example of a valve into which the applicant's invention can be incorporated. The invention is equally as applicable to gas valves for burner ignition systems not incorporating standing pilots, in which case the valve is of corresponding simpler construction.

Valve 10 includes a housing, which, for simplicity of illustration, is shown in two parts identified by reference characters 11a and 11b. As actually implemented, housing parts 11a and 11b would most likely be integrated into a single housing means.

As shown in FIG. 1, housing 11 defines a fluid inlet passageway 12 and a fluid outlet passageway 13 connected through a series of three valves generally identified by reference numerals 15, 16 and 17, of which valve 17 will hereinafter be referred to as the main valve.

Valve 15 functions as a safety valve having a power unit 18 which may be controlled by a flame sensing thermocouple, whereby valve 15 is normally held open only if a satisfactory flame is established in a furnace incorporating gas valve 10. For purposes of initially establishing the flame, valve 15 may be temporarily manually held open by means of a reset button 19.

Valve 16 is controlled by a solenoid 20, provided a control knob 21 is properly positioned, in response to a heat demand signal which may be produced by a thermostat. Thus, if permitted by the apparatus associated with knob 21, solenoid 20 will open valve 16 when there is a demand for heat, and will close valve 16 when the demand for heat is satisfied.

Main valve 17 includes a valve closure member 22 carried on a diaphragm actuator 23. Closure member 22 cooperates with a main valve seat 24 to vary the flow of gas between inlet passageway 12 and outlet passageway 13, provided valves 15 and 16 are open.

A pressure chamber 25 is formed between housing 11 and a first side of diaphragm 23 opposite the side on which valve seat 24 is located. A compression spring 26 within pressure chamber 25 between housing 11 and the first side of diaphragm 23 biases closure member 22 toward valve seat 24 to normally maintain valve 17 in a closed state.

Valve 17, however, may be variably opened by a pressure differential between opposite sides of diaphragm 23 as follows. Assuming valves 15 and 16 are open, the side of diaphragm 23 on which closure member 22 is mounted is subjected to the inlet gas pressure, which tends to open valve 17. However, the force produced by spring 26 is sufficient to keep valve 17 closed under normal inlet gas pressure unless the pressure in pressure chamber 25 is significantly less than the inlet gas pressure. The control pressure in chamber 25 is communicated thereto through a control pressure passageway 28, and is determined by the pressure in inlet passageway 12, the pressure in outlet passageway 13 and an electrically controlled servo valve generally identified by reference numeral 30.

Specifically, the pressure in inlet passageway 12 is transmitted to a manifold 31 through a first conduit 32 containing a flow restrictor 33. Manifold 31 is connected directly to pressure chamber 25 through control passageway or conduit 28. Manifold 31 is also connected to outlet passageway 13 through a conduit 34, servo valve 30 and a conduit 35.

Servo valve 30 includes a valve actuator in the form of a diaphragm 36 which cooperates with housing 11 to form a pressure chamber 37 between a first side of the diaphragm and a portion of the housing. Pressure chamber 37 is separated into two compartments by a stationary valve seat 38, the two compartments being connected to conduits 34 and 35 respectively, whereby valve seat 38 provides for fluid communication between conduits 34 and 35.

Diaphragm 36 carries a valve closure member 39 on a stem 40 which extends through valve seat 38 to control fluid flow between conduits 34 and 35. The deflection of diaphragm 36 and the position of closure member 39 along an axis 41 relative to valve seat 38 are controlled by the pressure in outlet passageway 13, as communicated through conduit 35, and the force exerted on the opposite side of diaphragm 36 by a regulator spring 42. Regulator spring 42 has a first end seated on the second side of diaphragm 36 and a second end seated on a spring retainer 43 mounted on one end of and guided by a stem or strut 44.

In operation, for any fixed position of retainer 43, if the pressure in outlet passageway 13 decreases, the pressure on the side of the diaphragm opposite spring 42 likewise decreases, and spring 42 deflects diaphragm 36 downwardly, thus moving closure member 39 away from valve seat 38. This opens servo valve 30 and decreases the pressure in conduit 28 and pressure chamber 25 by allowing the pressure in manifold 31 to bleed off to outlet passageway 13. The reduced pressure in pressure chamber 25 causes diaphragm 23 to deflect downwardly, thus opening main valve 17 and restoring the pressure in outlet passageway 13 to the value determined by the position of retainer 43 along axis 41.

The position of retainer 43 along axis 41 is determined both by a solenoid generally identified by reference numeral 46 which is operated in accordance with the desired low or high firing rate status of valve 10, and by a manually operated selector assembly generally identified by reference numeral 47 which may be positioned to select a desired pressure range, such as the range suitable for either natural gas or LP gas. Solenoid 46 includes a solenoid coil 48 carried in a frame 49, and has a cylindrical opening 50 therethrough centered on and extending along axis 41.

A stationary support assembly, shown as comprising a tubular barrel 51, is also centered on and extends along axis 41 through opening 50 through coil 48. A first end of tubular barrel 51 is fitted with an externally threaded plug 52 which engages an internally threaded boss 53 of housing 11b. The mating threads permit the position of tubular barrel 51 to be adjusted relative to housing 11b along axis 41. As will be described hereinafter, this adjustment determines the high firing rate flow through valve 10 for the natural gas pressure range. A lock nut 54 on plug 52 provides for locking tubular barrel 51 in place relative to housing 11b. Plug 52 is also formed with a longitudinal opening 55 therethrough for guiding movement of strut 44 along axis 41.

A movable support assembly generally identified by reference numeral 56 is mounted within tubular barrel 51 for movement relative thereto along axis 41. Support assembly 56 is biased toward a stop 57 formed by an internal shoulder within tubular barrel 51 by means of a compression spring 58 between an end surface 59 of plug 52 and the support assembly.

Support assembly 56 includes a tubular section or member 60 having a first end fitted with a cylindrical magnetic pole piece 61 which extends from a location within solenoid coil 48 to a location outside the bottom end of the coil, as shown in the figures. A solenoid armature 63 is mounted within tubular section 60 for movement relative thereto along axis 41 between a lower stop 64 formed by the upper end of magnetic pole piece 61 and an upper stop 65 formed by an annular element at the upper end of tubular section 60 having external threads which mate with internal threads in the tubular section. Armature 63 is biased toward stop 65 by means of a compression spring 66 between the armature and pole piece 61. Stop 65 has an adjustable feature which provides for low firing rate adjustment of valve 10 for the natural gas pressure range, as will be described hereinafter.

Armature 63 extends from a location within solenoid coil 48 to a location outside the upper end of the coil. As can be observed, the magnetic circuit formed by solenoid coil 48, pole piece 61 and armature 63 has substantially the same total air gap regardless of the position of support assembly 56 within its limits of travel. This advantageous feature provides for relatively constant magnetic characteristics for any position of support assembly 56.

Figure 2:
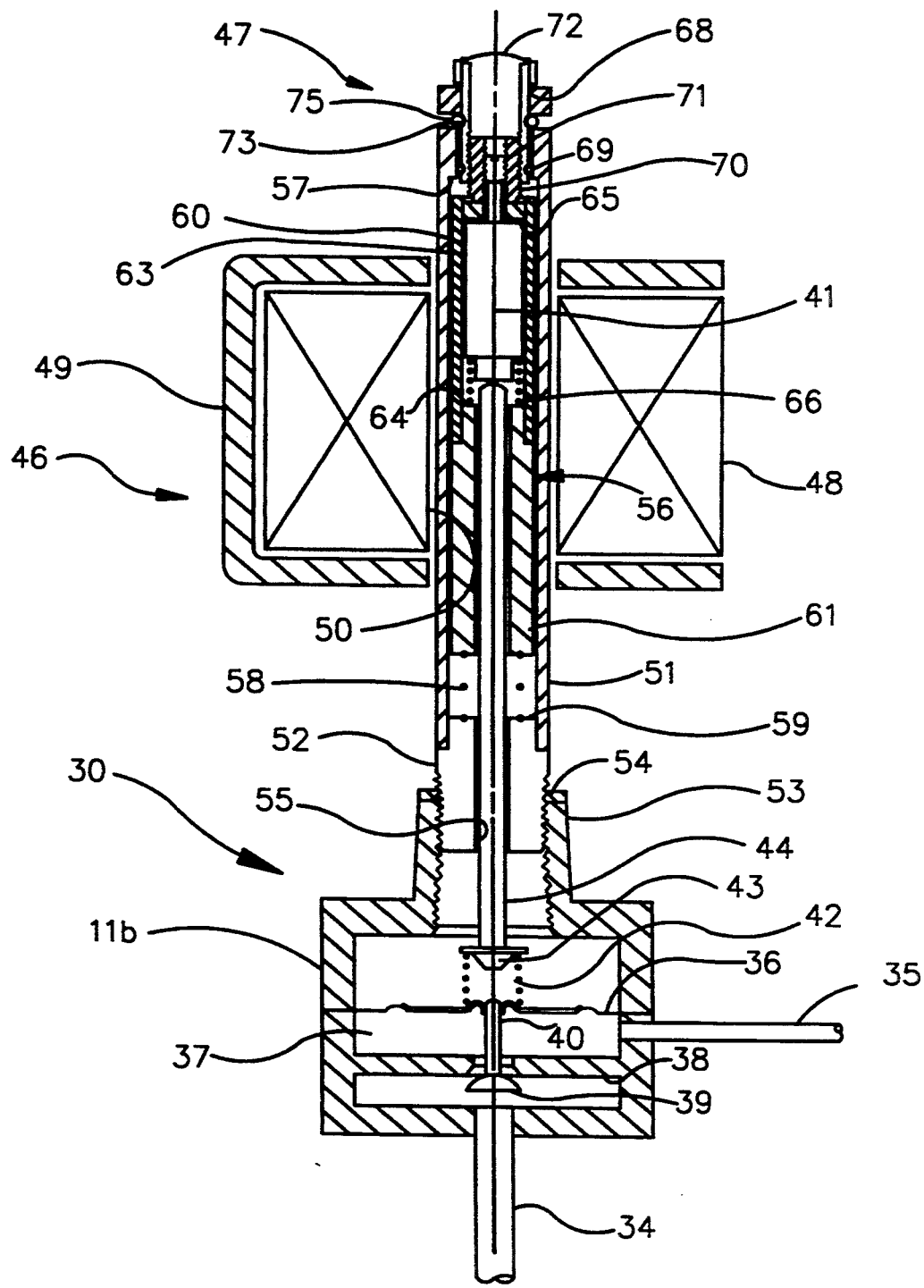
FIG. 2 is an enlarged cross-sectional view of the pressure regulator servo valve used in FIG. 1, the selector being extended to its natural gas setting.

Selector assembly 47 at the upper end of tubular barrel 51 in FIGS. 1 and 2 includes a hollow push button 68 slideable within barrel 51 along axis 41. An O-ring seal 69 is shown between barrel 51 and push button 68.

An outer stop 70 extends outside the lower end of push button 68, and is threadably engaged therewith by means of mating internal threads in the push button and external threads on the stop. An inner stop 71 is located within outer stop 70, and is threadably engaged therewith by means of mating internal threads on stop 70 and external threads on stop 71. The mating threads on the various elements of selector assembly 47 provide for high and low firing rate adjustments of valve 10 for the LP gas pressure range, as will be described hereinafter.

Push button 68 has an open upper end which is fitted with a removable cap 72 to permit access to stops 70 and 71 for adjustment thereof. A circumferential groove 73 is formed in the external surface of push button 68 at a location within barrel 51. Barrel 51 is formed with openings in the wall thereof through which portions of a resilient clip 75 protrude to engage groove 70 and retain assembly 47 in its depressed position when that position has been selected.

As shown in FIG. 1, selector assembly 47 is in its extended position in which stops 70 and 71 do not limit travel of support assembly 56 or armature 63. With selector assembly 47 in its extended position and solenoid 46 unenergized, spring retainer 43 is retracted as far as possible. Thus, regulator spring 42 is in a state of maximum extension and exerts minimum force on the upper side of diaphragm 36, thereby causing valve 10 to provide minimum regulated outlet pressure. The conditions which result in retraction of retainer 43 can be understood by observing that armature 41 is at its upper limit of travel as determined by stop 65 in support assembly 56, and support assembly 56 is at its upper limit of travel as determined by stop 57 in barrel 51. The position of barrel 51 relative to housing 11b is determined by the adjustment provided by the external threads on plug 52 and internal threads in boss 53.

When high firing rate is called for and solenoid coil 48 is correspondingly energized, the resulting magnetic force overcomes the bias of compression spring 66 and pulls armature 63 into contact with stop 64 at the upper end of pole piece 61. This movement of armature 63 is transmitted to spring retainer 43 through strut 44, which, in turn, compresses regulator spring 42 to a position determined by the adjustment provided by the mating threads on plug 52 and in boss 53.

In FIG. 2, the various elements of the servo valve are identified by the same reference numerals as those elements in FIG. 1. Selector assembly 47 is shown in its depressed LP gas position. Selector assembly 47 is retained in that position by groove 73 and retaining clip 75. As illustrated, with selector assembly 47 in its depressed position, outer stop 70 establishes the upward travel limit for support assembly 56, and inner stop 71 establishes the upward travel limit for armature 63. When solenoid coil 48 is unenergized, corresponding to the low firing rate condition, upward travel of armature 63, and hence extension of regulator spring 42 is determined by stop 71.

In particular, armature 63 is shown with an upward protrusion thereon which extends through stop 65, into outer stop 70, and into contact with inner stop 71. It should be noted that this function can be accomplished equally as well by eliminating the protrusion on armature 63 and lengthening stop 71 to extend through stop 65 into contact with the upper end of the armature. In any event, contact of armature 63 with stop 71 corresponds to maximum extension of regulator spring 42, and thus a low firing rate state of valve 10 for the LP gas pressure range. Obviously, the low firing rate can be adjusted by adjusting the position of inner stop 71 along axis 41.

Energization of solenoid coil 48, which corresponds to a commanded high firing rate, results in armature 63 being pulled into contact with stop 64 on pole piece 61. The position of pole piece 61 along axis 41 is determined by the upper travel limit of support assembly 56 as established by the position of outer stop 70. Thus, repositioning stop 70 results in adjustment of the high firing rate state of valve 10 for the LP gas pressure range.

The embodiment of the invention shown in FIG. 3 is similar to that shown in FIGS. 1 and 2, except primarily for implementation of the selector assembly, and for modifications necessary for use of the servo regulator valve with a main valve requiting closure of the servo regulator valve to increase main valve outlet pressure.

In FIG. 3, reference numeral 80 identifies an electrically controlled servo regulator valve for controlling fluid flow between a manifold or other element functionally analogous to manifold 31 in FIG. 1 and a conduit analogous to conduit 35 in FIG. 1. Servo regulator valve 80 includes a valve actuator diaphragm 81 which cooperates with a servo regulator valve housing generally identified by reference numeral 82 to form a pressure chamber 83 between a first side of a diaphragm and a portion of the housing. Pressure chamber 83 is separated into two compartments by a stationary valve seat 84, the two compartments being connected to two elements corresponding to manifold 31 and conduit 35 in FIG. 1. Diaphragm 81 carries a valve closure member 85 to control fluid flow through valve seat 84.

Deflection of diaphragm 81 and the position of closure member 85 relative to valve seat 84 are controlled in part by the force exerted on the opposite side of diaphragm 81 by a regulator spring 86. Regulator spring 86 has a first end seated on a spring retainer plate on diaphragm 81, and a second end seated on a spring retainer 87 mounted on one end of and guided by a strut 88. The position of spring retainer 87 relative to housing 82 is determined both by a solenoid generally identified by reference numeral 90, which is energized in accordance with the desired low or high firing rate status of the main valve, and by a manually operated selector assembly generally identified by reference numeral 91, which may be positioned to select a desired pressure range.

Solenoid 90 includes a solenoid coil 92 carried in a frame 93, and has a longitudinal opening 94 therethrough. A stationary support assembly comprising a tubular barrel 95 extends through opening 94, and is connected at a first end thereof to housing 82 by means of a plug 96 on the first end of the barrel, the plug extending into a boss 97 on housing 82. The position of plug 96 relative to housing 82 is fixed by pressing the plug into the boss or by other suitable means of connection.

A movable support assembly generally identified by reference number 100 is slidably mounted within barrel 95, and is biased toward a first stop 101 of annular configuration by means of a compression spring 102 between plug 96 and the movable support assembly. Support assembly 100 includes a tubular section 103 having a first end fitted with a cylindrical magnetic pole piece 104 which extends from a location within coil 92 to a location outside the bottom end of the coil. A solenoid armature 106 is mounted within tubular section 103 for movement relative thereto between a lower stop 107 formed by the upper end of magnetic pole piece 104, and an upper stop 108 formed by an annular element internal to the upper end of tubular section 103, the annular element having external threads which mate with internal threads in the tubular section. Armature 106 is biased toward stop 108 by means of a compression spring 109 between the armature and pole piece 104.

Selector assembly 91 at the upper end of barrel 95 includes a hollow knob 110 rotatable about the axis of the barrel and slidable along axis with respect to barrel. An outer stop 111 threadably engages knob 110, and is adapted to extend through annular stop 101 to engage an annular extension 112 attached to the upper end of tubular section 103. Annular extension 112 has a smaller internal diameter than the internal diameter of annual stop 101 to permit extension 112 to be contacted by outer stop 111 of the selector assembly. An inner stop 115 is located within outer stop 111, and is threadably engaged therewith by means of mating internal threads on outer stop 111 and external threads on inner stop 115.

Hollow knob 110 is removable to permit access to stops 101 and 108 for adjustment thereof. The upper end of the knob is open to permit access to stops 111 and 115 for adjustment thereof. The open upper end of knob 110 is fitted with a removable cap 116.

Knob 110 is shown as protruding through an aperture in stationary structure 117 associated with housing means 82, knob 110 and stationary structure 117 being configured to provide cooperating elements which form a cam arrangement for axially repositioning the knob with respect to tubular barrel 95 in response to rotation of the knob, as will be described in greater detail in connection with FIG. 4.

Additional elements in FIG. 3 comprise an O-ring 120 surrounding magnetic pole piece 104 within tubular barrel 95, and serving in part to restrain rotation of movable support structure 100 so as to facilitate adjustment of threaded stop 108. Reference numeral 121 identifies an O-ring which provides a rotary seal between knob 110 and tubular barrel 95. Reference numeral 122 identifies a compression spring between solenoid support 93 and the lower end of knob 110 to maintain the knob in the axial position established by the cam arrangement.

As illustrated in the perspective view of FIG. 4, stationary structure 117 is configured with internal ramp or cam surfaces 125 which cooperate with cam follower projections 126 on knob 110. Thus, as knob 110 is rotated with respect to stationary structure 117, the cam followers follow the cam surface and cause axial movement of the knob. Protrusions 127 and 128 on cam surfaces 125 serve to retain knob 110 in its counterclockwise and clockwise rotational positions respectively corresponding to natural and LP gas pressure ranges for the pressure regulator valve.

As is apparent from examination of FIGS. 3 and 4, with knob 110 rotated to its counterclockwise natural gas position, stops 111 and 115 are retracted, and the upward travel limits of movable support assembly 100 and armature 106 are respectively established by annular stops 101 and 108. This results in maximum high and low firing rate extensions of regulator spring 86, and pressure regulation to a lower pressure range suitable for use with natural gas. Conversely, clockwise rotation of knob 110 to its LP position causes stops 111 and 115 to be extended into contact with movable support assembly 100 and armature 106 respectively, thus providing increased compression of regulator spring 86, and pressure regulation to a higher pressure range for use with LP gas.

In accordance with the foregoing discussion, a servo valve regulator spring is provided with four individually adjustable compressions corresponding to four regulated output pressures. Thus, electrically selectable high and low firing rate pressures can be provided for each of two manually selectable pressure ranges. Further, conversion between the pressure ranges is accomplished without replacement of any valve components, and no adjustments are required when converting from one pressure range to the other.

Although a particular embodiment has been shown and described for illustrative purposes, various modifications and other embodiments in accordance with the applicant's teaching will be apparent to those of ordinary skill in the relevant arts. It is not intended that coverage be limited to the embodiments shown, but only by the terms of the following claims.

The embodiments of the invention in which an exclusive property or right is claimed are defined as follows:

1. A fluid pressure regulating valve comprising:
   flow control means operable to vary fluid flow as a function of extension of a regulator spring;
   a solenoid coil having a cylindrical opening therethrough centered on and extending along an axis;
   first support means generally within the opening through said solenoid coil and mounted for movement along the axis;
   positioning means for locating said first support means at either of first and second positions along the axis;
   an armature mounted in said first support means for travel in first and second directions along the axis in response to first and second energization states respectively of said solenoid coil, travel in the first and second directions normally being limited by first and second stops respectively on said first support means;
   a selector assembly carrying a third stop movable between third and fourth positions along the axis, the third stop, in the fourth position, establishing a travel limit of said armature in the first direction; and
   linkage between said armature and the regulator spring in said flow control means for varying extension of the regulator spring as a function of position of said armature.

2. The pressure regulating valve of claim 1 wherein said first support means comprises:
   a tubular section concentric with the axis, containing said armature for slidable movement therein, and having the first and second stops proximate first and second ends thereof respectively, said armature being biased toward the first stop; and
   a magnetic pole piece fixed to the second end of said tubular section, said tubular section and said magnetic pole piece having a combined length and being positioned relative to said solenoid coil such that said armature and said magnetic pole piece extend at least to the ends of the opening through said solenoid coil.

3. The fluid pressure regulating valve of claim 2 further including:
   a housing;
   second support means extending from said housing through the opening through said solenoid coil, containing said first support means for slidable movement therein, and carrying said selector assembly thereon.

4. The fluid pressure regulating valve of claim 3 wherein said second support means comprises a tubular barrel concentric with the axis, attached at a first end thereof to said housing and, proximate a second end thereof, carrying a fourth stop positioned to limit movement of said first support means away from said housing, said first support means being biased toward the fourth stop to establish the first position of said first support means along the axis.

5. The fluid pressure regulating valve of claim 4 wherein said selector assembly comprises:
   a selector member adapted to be located at either of fifth and sixth positions along the axis relative to said second support means, the fifth position being further from said housing than the sixth position;
   a fifth stop concentric with the axis and carried by said selector member, said fifth stop, when said selector member is in the sixth position, being positioned to limit movement of said first support means away from said housing to establish the second position of said first support means along the axis, said fifth stop further carrying said third stop.

6. The fluid pressure regulating valve of claim 5 wherein: first, second, third and fourth threaded adjustment means are provided between the first stop and the tubular section of said first support means, the third stop and the fifth stop, the fourth stop and the tubular barrel of said second support means and the fifth stop and said selector member respectively to provide for individual adjustment respectively of low pressure set points for low and high regulated pressure ranges and high pressure set points for low and high pressure ranges.

7. The fluid pressure regulating valve of claim 6 wherein said linkage comprises a strut extending along the axis between said armature and the regulator spring in said flow control means.

8. The fluid pressure regulating valve of claim 7 wherein:
   the tubular barrel of said second support means is attached to said housing through a plug having a central guide hole therethrough for guiding said strut; and
   said magnetic pole piece has a central hole therethrough through which the strut extends.

9. The fluid pressure regulating vane of claim 8 wherein:
   stationary structure is provided proximate the second end of the tubular barrel of said second support means; and
   said selector member comprises a knob rotatable about the axis and having cam follower means thereon which cooperates with the cam surface on said stationary structure to cause axial repositioning of the third and fifth stops in response to rotation of the knob.

10. The fluid pressure regulating valve of claim 9 wherein said first, second, third and fourth threaded adjustment means are accessible at the second end of the tubular barrel of said second support means.

11. In a pressure regulating valve of the type including housing means defining a servo regulator valve seat and containing a closure member moveable along an axis toward and away from the servo regulator valve seat by means of a diaphragm responsive to the force exerted by a regulator spring between the diaphragm and a spring retainer whose position along the axis is determined in part by a solenoid, the improvement which comprises:
- a first support assembly mounted on the housing means and extending along the axis through an opening in the solenoid coil;
- a second support assembly, an armature and a selector assembly, each individually moveable along the axis, said armature acting on the spring retainer to vary the extension of the regulator spring along the axis;
- a first stop on said first support assembly, said second support assembly being biased toward said first stop to establish a first position of said second support assembly along the axis relative to the servo regulator valve seat;
- second and third stops on said second support assembly which respectively establish travel limits for said armature toward and away from the servo regulator valve seat;
- positioning means associated with said selector assembly for permitting said selector assembly to be selectively located at either of second and third positions along the axis relative to the servo regulator valve seat, the third position being closer to the servo regulator valve seat than the second position, said selector assembly further including fourth and fifth stops which, when said selector assembly is in the third position, respectively further limit movement of said armature and said second support assembly away from the servo regulator valve seat.

12. The pressure regulating valve of claim 11 wherein:
- the solenoid coil extends between first and second locations along the axis;
- said armature extends along the axis from a location between the first and second locations to a location on the opposite side of the second location from the first location;
- said second support assembly includes a magnetic pole piece extending along the axis from a location between the first and second locations to a location on the opposite side of the first location from the second location; and
- said armature is biased away from said magnetic pole piece to normally provide an air gap therebetween.

13. The pressure regulating valve of claim 12 wherein:
- said first support assembly includes a tubular barrel extending along the axis through the opening through the solenoid coil;
- a first end of the tubular barrel of said first support assembly is attached to the housing means;
- a second end of the tubular barrel of said first support assembly carries said first stop; and
- the position of said first stop is adjustable along the axis relative to the servo regulator valve seat.

14. The pressure regulating valve of claim 13 wherein:
- said second support assembly includes a tubular member;
- said armature is contained within the tubular member of said second support assembly for movement between the second and third stops, said armature being biased toward the second stop; and
- the position of the second stop is adjustable along the axis relative to the remainder of said second support assembly.

15. The pressure regulating valve of claim 14 wherein:
- said selector assembly includes a knob rotatable about the axis;
- the positioning means of said selector assembly comprises a stationary structure proximate said knob and cooperating elements of a cam arrangement on the knob and the stationary structure configured to reposition the knob along the axis in response to rotation of the knob; and
- the fourth and fifth stops are coaxial elements, the fifth stop threadably engaging the knob, and the fourth stop threadably engaging the fifth stop.

16. The pressure regulating valve of claim 15 wherein the cam arrangement of said selector assembly is configured to releasably retain the knob at either of first and second rotational positions respectively corresponding to the second and third positions of said selector assembly along the axis.

17. The pressure regulating valve of claim 16 wherein:
- the housing means further defines fluid inlet and fluid outlet passageways and a main valve seat for providing flow between the fluid inlet and fluid outlet passageways;
- a main valve closure member is mounted in the housing means for movement relative to the main valve seat for varying flow between the fluid inlet and fluid outlet passageways; and
- a main valve actuator is operable to vary the position of said main valve closure member relative to the main valve seat in response to variations in a control pressure, determined by flow through the servo regulator valve seat.

18. A pressure regulator having first and second electrically determinable states for each of a plurality of pressure ranges, the pressure range being changeable without parts replacement, the regulator comprising:
- housing means defining fluid inlet and fluid outlet passageways and a main valve seat providing for flow between the fluid inlet and fluid outlet passageways;
- a main valve closure member mounted in said housing means for movement relative to the main valve seat for varying the flow between the fluid inlet and outlet passageways;
- a main valve actuator operable to vary the position of said main valve closure member relative to the main valve seat in response to variations in a control pressure;
- a servo regulator valve assembly for producing the control pressure in response to the pressure in the fluid outlet passageway, the control pressure further being dependent on biasing provided by a regulator spring whose extension along an axis is determined in part by the position along the axis of a spring retainer in contact with one end of the regulator spring:
- a solenoid coil having a cylindrical opening therethrough centered on and extending along the axis;
- a tubular barrel connected at a first end thereof to said housing means, and extending through the opening through said solenoid coil;
- a first stop in said tubular barrel proximate a second end thereof,
- a support assembly including a tubular member slidably mounted within said tubular barrel for movement along the axis, said support assembly being biased toward the first stop;

second and third stops respectively proximate opposite ends of the tubular member, the second stop being further from said housing means than the third stop;

a solenoid armature mounted within the tubular member for slidable movement along the axis between the second and third stops, said solenoid armature being biased toward the second stop;

a strut extending between the spring retainer for the regulator spring and said solenoid armature;

a selector assembly proximate a second end of said tubular barrel, said selector assembly being selectively positionable along the axis relative to said tubular barrel at either of first and second positions, the first position being further from said housing means than the second position; and fourth and fifth stops on said selector assembly, said fourth and fifth stops, when said selector assembly is in its second position, respectively limiting movement of said support assembly and said armature away from said housing means.

19. The pressure regulator of claim 18 wherein:

said support assembly includes a magnetic pole piece which extends along the axis a first direction from within said solenoid coil to at least the outer boundary thereof;

said solenoid armature extends along the axis in a second direction opposite the first direction from within said solenoid coil to at least the outer boundary thereof; and said solenoid armature and the magnetic pole piece are normally biased apart to form an air gap therebetween.

20. The pressure regulator of claim 19 wherein said selector assembly comprises:

a knob rotatable about the axis, said knob carrying said fourth and fifth stops;

a portion of said housing means proximate said knob; and a cam arrangement including cooperating elements on said knob and said portion of said housing means configured to reposition said knob along the axis between the first and second positions in response to rotation thereof about the axis.

21. The pressure regulator of claim 20 wherein the positions along the axis of said first stop relative to said tubular barrel, said second stop relative to said tubular member, and said fourth and fifth stops relative to said knob are individually adjustable.

* * * * *

UNITED STATES PATENT AND TRADEMARK OFFICE
CERTIFICATE OF CORRECTION

PATENT NO. : 5,435,343

DATED : July 25, 1995

INVENTOR(S) : James G. Buezis

It is certified that error appears in the above-identified patent and that said Letters Patent is hereby corrected as shown below:

Column 10, line 48, cancel "vane", insert --valve--.

Column 12, line 66, cancel ",", insert --;--.

Signed and Sealed this

Tenth Day of October, 1995

BRUCE LEHMAN

Attest:

Attesting Officer

Commissioner of Patents and Trademarks